Dec. 22, 1936.  E. M. MAY  2,065,087
VALVE
Filed Sept. 7, 1935  3 Sheets-Sheet 1
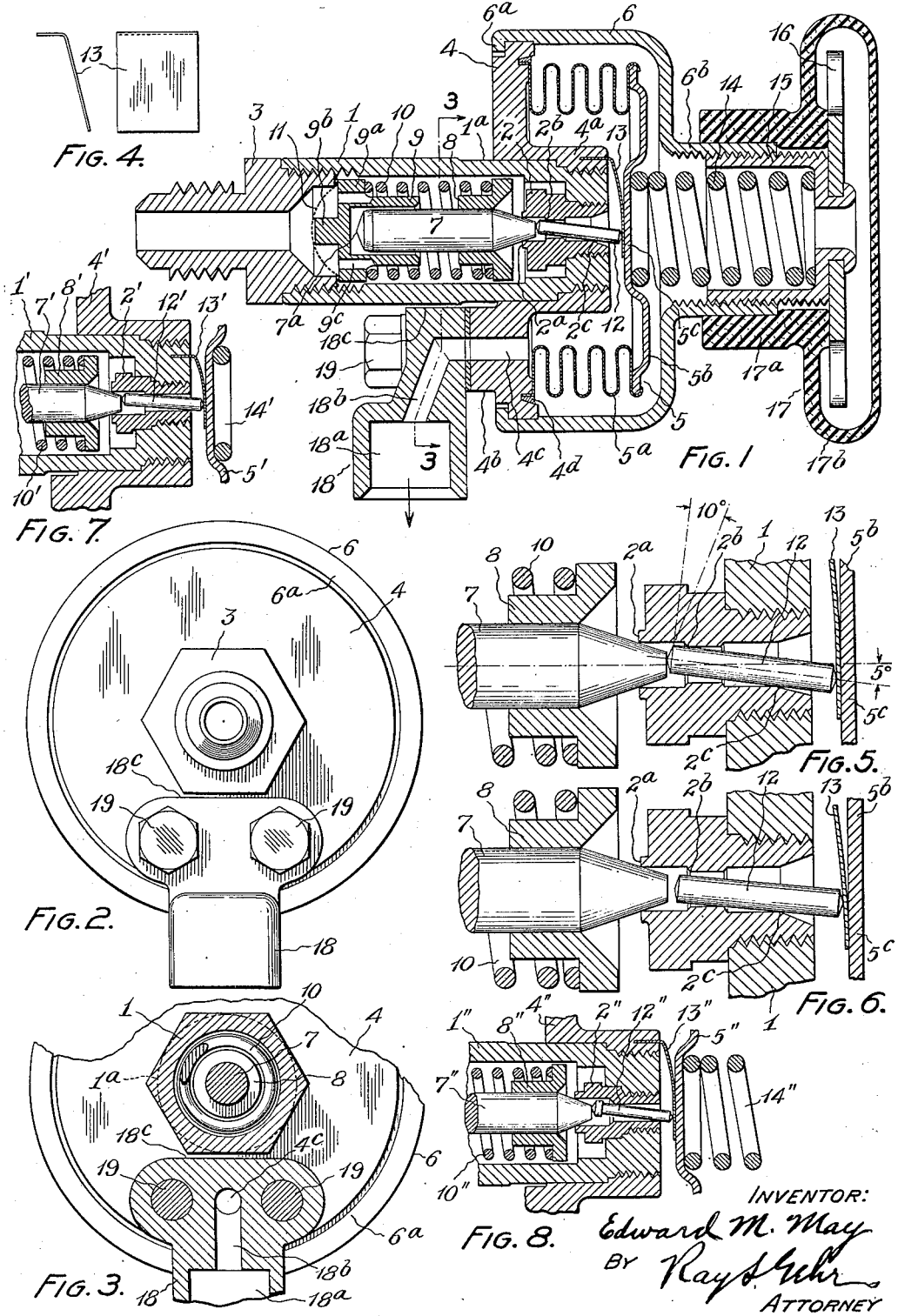
INVENTOR:
Edward M. May
BY Ray H. Gehr
ATTORNEY Dec. 22, 1936. E. M. MAY 2,065,087
VALVE
Filed Sept. 7, 1935 3 Sheets-Sheet 3

INVENTOR:
Edward M. May
BY Ray S. Gehr
ATTORNEY

Patented Dec. 22, 1936

2,065,087

UNITED STATES PATENT OFFICE 2,065,087

VALVE

Edward M. May, Detroit, Mich.

Application September 7, 1935, Serial No. 39,585

13 Claims. (Cl. 50—23)

The invention relates to improvements applicable to valves of various kinds used to control the flow of fluids. The improvements have been devised in connection with expansion valves and other valves such as are used in refrigeration apparatus to control the flow of the liquid refrigerant and, accordingly, it will be convenient to describe the invention primarily as so applied, though it will be understood that it has various other applications.

When, as in case of refrigerant expansion valves, a very nice fit between the valve and its seat is essential to avoid leakage, it has heretofore been found difficult in practice to maintain such fits. A satisfactory fit could be provided initially, but usually the valve is made of very hard metal and the seat of softer metal and it has been found extremely difficult, in the handling and use of the valve, to prevent deformation of the softer metal seat and a very slight deformation of the seat results in serious leakage.

As valves have heretofore been constructed it has been necessary to provide a certain amount of play between the valve and the means for guiding it in its movement, in order that the valve might have a certain amount of freedom in finding its seat. Hence a certain amount of lateral movement of the valve relative to its seat could not be prevented. In the case of refrigeration expansion valves, for example, it has been found with valves of prior forms of construction that mere jar or shock incident to handling the valve device during shipment might, because of the inertia of the valve, cause a sufficient deformation of the seat to convert a valve that operated perfectly on leaving the factory into a "leaker" before it reached the hands of the user, a deformation amounting to the fraction of a thousandth of an inch having serious consequences in valves of this type. Furthermore, in the operation of valves of this type the flow of the liquid past the unseated valve has been found to set up a lateral reed-like vibration with an accompanying humming sound and to cause a pounding of the valve against the seat with resultant deformation and leakage.

Accordingly one of the chief objects of the present invention is the provision of an improved construction for valves in which the valve member is very accurately guided in its seating and unseating movements and is effectively held at all times against lateral movement caused by inertia or the like.

A further object of the invention is to provide a valve construction in which the required degree of accuracy in the fit of various parts, particularly of the valve seat and valve guide parts, is more readily attained.

Another object of the invention is to simplify and reduce the production cost of valves and particularly expansion valves.

A further object of the invention is the provision of an improved form of float actuated valve suitable for use in refrigeration and other apparatus.

Another object of the invention is the provision of an improved check valve.

Other objects of the invention more or less ancillary or incidental to those above enumerated will be apparent from the following description having reference to the accompanying drawings.

In the drawings, Fig. 1 is a longitudinal sectional view through the axis of an expansion valve embodying my improvements.

Fig. 2 is a left end view of the valve shown in Fig. 1.

Fig. 3 is a fragmentary section on the line 3—3 of Fig. 1.

Fig. 4 shows edge and face views of one of the parts of the valve mechanism.

Fig. 5 is a fragmentary sectional view of the valve, valve seat and valve guide devices, the parts being shown on an enlarged scale for greater clearness.

Fig. 6 is an enlarged view similar to Fig. 5 but showing the parts in the relative positions occupied when the pressure on the discharge side of the valve rises beyond a predetermined point.

Fig. 7 is a fragmentary sectional view showing a modification of the valve construction illustrated in Fig. 1.

Fig. 8 is a fragmentary sectional view showing another modification of the valve guiding and actuating devices illustrated in Fig. 1.

Figure 9:
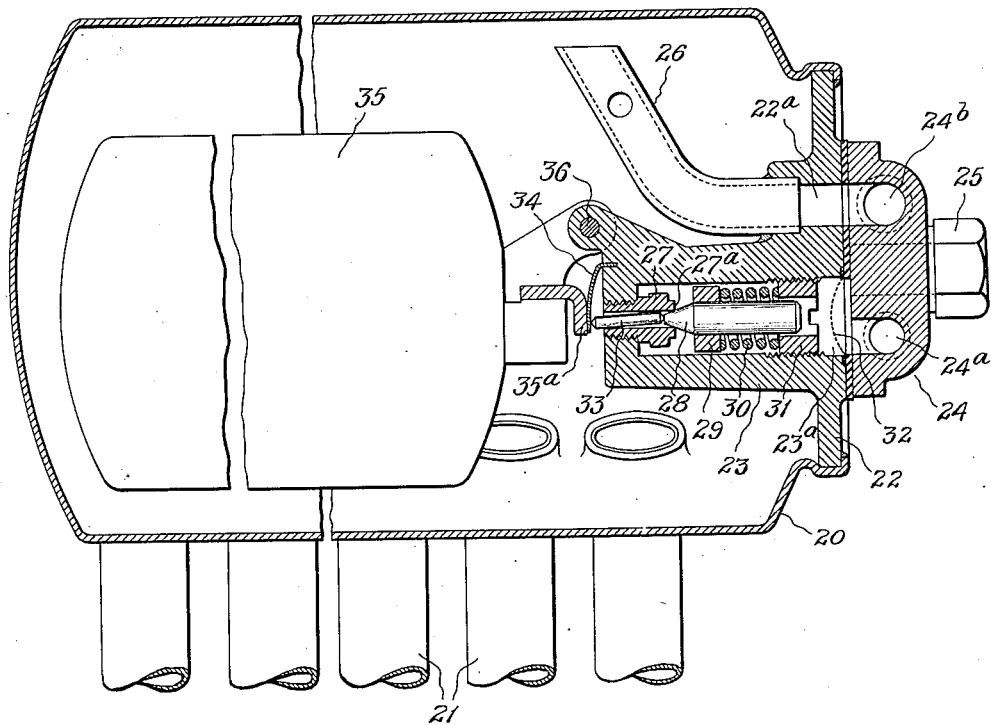
Fig. 9 is a vertical sectional view of a refrigerant evaporator of the flooded type embodying a float actuated valve of improved construction, some of the parts of the evaporator being broken away to permit illustration on a larger scale.

Referring in detail to the constructions illustrated, and first to the expansion valve shown in Figs. 1 to 6, inclusive, the casing structure of the valve comprises an inlet chamber unit and an outlet chamber unit. The inlet chamber unit consists of an elongated part 1, a valve seat member 2 and a pipe connection 3. The part 1 is hexagonal exteriorly (Fig. 3) except at 1a where it is turned down to cylindrical form. The part 1 can conveniently be formed from hexagonal bar stock, as can also the valve seat member 2 and the pipe connection 3. The passage of the connection 3 constitutes the inlet to the inlet chamber unit of the casing while the passage of the valve seat member 2 constitutes the outlet therefrom.

The outlet chamber unit of the casing structure comprises a circular disc-like body 4 formed on one side with an internally threaded boss 4a in which the externally threaded end of the inlet chamber 1 is detachably secured, the cylindrical portion 1a of the part 1 fitting the aperture in the member 4. On its outer side member 4 is formed with a boss 4b through which extends an outlet passage 4c. 5 designates as an entirety a movable diaphragm of the bellows type comprising a metallic bellows part 5a and a relatively rigid plate or disc 5b which is hermetically connected to and closes one end of the bellows. The other end of the bellows is hermetically secured by solder or the like 4d in a groove formed in the face of the member 4. A cup-like casing part 6, which can conveniently be drawn from sheet metal, has its larger end rigidly secured to the outer periphery of the member 4, this being accomplished in the construction shown by spinning the edge 6a of the part 6 around the edge of the member 4. The casing part 6 is formed with an internally threaded boss 6b, the purpose of which will be referred to later.

In the inlet chamber unit of the casing is disposed a valve 7 of the needle type. This valve may appropriately be of the composite construction disclosed in my United States Letters Patent No. 1,964,687, the shank of the valve being formed preferably of stainless steel while the conical end or tip is formed of a hard alloy, such as Stellite. The valve member 7, adjacent to its conical end, carries a flanged sleeve 8 which is rigidly secured to the valve by a forced fit therewith. The other end of the valve 7 has a loose sliding fit in the socket of guide 9 which is formed with a flange 9a that abuts against the inner end of the connection 3. The flange 9a thus affords a fixed abutment for one end of a coiled spring 10, the other end of which engages the flange of the sleeve 8 so that the spring serves to press the valve 7 toward the seat member 2. A screen 11 is preferably interposed between the end of the connection 3 and the guide member 9 and, to prevent crushing in of the screen when the parts are assembled, the guide 9, as hereinafter explained, is formed with a lug or boss 9b to support the central part of the screen. The guide 9 is formed with a plurality of passages 9c to insure free passage of fluid past the guide.

In the passage through the valve seat member 2 is disposed a thrust pin 12 with one end engaging the flat truncated end of the valve 7 and its other end engaging a buffer vane 13 which in turn is engaged by the central part 5c of the diaphragm plate 5b. The vane 13, which may appropriately be a thin sheet of hard bronze, is secured at one end to the boss 4a, having its other end free to flex and move with the movement of the diaphragm. The vane 13 can be secured to the boss 4a in any suitable manner but as shown the boss is slotted to receive the short arm of the vane and the metal of the boss is then upset to tightly clamp the vane. By suitably forming the vane 13 of elastic material its free end can be made to press resiliently against the adjacent end of the thrust pin 12. I prefer to give the resilient vane the free form shown in Fig. 4 for a purpose which will presently be described.

The pin 12 performs a novel and important function in my improved valve. This will best be understood from a consideration of Figs. 5 and 6 which show the parts on an enlarged scale. It will be noted that the bore of the valve seat member 2 is formed with an intermediate section between its ends of smaller diameter than the sections on either side thereof and that the outlet end of the bore is flared. The edge 2a of the inlet end of the bore serves as a seat proper for the valve 7. The pin 12 is considerably smaller in diameter than the smallest part of the valve seat passage or bore and the two ends of the pin are given a rather flat conical form so as to have point contacts with the flat surfaces of the valve and vane, respectively. The angle of the sides of the conical ends may appropriately be about 10 degrees as indicated in Fig. 5. With the parts thus constructed the pin 12, when pressure is applied to the two ends thereof by the valve 7 and the vane 13, assumes an inclined position in the bore of the seat member 2, with one side of the pin engaging the shoulder 2b of the valve seat member at the junction of the two cylindrical parts of the bore of different diameters and with its other side engaging the edge or corner 2c formed at the smaller end of the flared section of the bore. The forms and dimensions of the parts, as shown in Figs. 1 and 6, are such that the axis of the thrust pin 12 when thus engaging the opposite sides of the bore of the valve seat member forms an angle of approximately 5° with the axis of the said bore. The significance of this construction will presently be explained.

A strong coiled spring 14 has one end arranged to press against the plate 5b of the bellows diaphragm while its other end has an abutment against a flanged sleeve 15 which threadably engages the internally threaded boss 6b of the casing part 6. A serrated hand wheel 16 is rigidly secured to the sleeve 15 and by manually turning this wheel the pressure of the spring 14 against the diaphragm can be varied. To prevent access of moisture to the interior of the casing part 6, a rubber cap 17 is provided which has a relatively thick and stiff cylindrical part 17a which fits over the cylindrical boss 6b, while the thinner, softer and more flexible part 17b of the cap encompasses the hand wheel 16. The thinner part 17b of the rubber cap is sufficiently soft and flexible to be collapsed against the serrated edge of the hand wheel 16 so that the latter can be turned without removing the rubber cap. This obviates the necessity of removing the rubber cap when the tension of the spring 14 is adjusted.

The outlet unit of the casing is provided with a discharge connection 18 which is secured to the flat face of the outlet boss 4b of member 4 by means of machine screws 19. This connection is formed with a socket 18ª, which can be sweated on the end of a tube or pipe, and has a passage 18ᵇ arranged to communicate with the discharge passage 4ᶜ of the casing member 4. The connection 18 is formed at one end with a flat face 18ᶜ arranged to lie closely adjacent a face of the hexagonal surface of the casing member 1 when the latter is screwed home in the casing member 4 (Figs. 1 and 3). The member 1 is thus effectively locked against displacement in relation to the member 4.

In a typical use of the expansion valve described above, its connection 3 is connected with the high pressure side of a refrigerating system and the connection 18 to the low pressure side thereof. In the operation of the valve as thus connected, when the pressure in the low pressure side of the system falls to a certain point, which is determined by the tension of the spring 14, the pressure of said spring against the diaphragm plate 5ᶜ, transmitted through the thrust pin 12 to the valve 7, becomes great enough to overcome the tension of spring 10 so that the valve is lifted off its seat and liquid refrigerant from the high pressure side of the system is allowed to pass. When the pressure in the low pressure side of the system again rises the large spring 14 is sufficiently compressed by the diaphragm 5 to permit the spring 10 to move the valve 7 back to its seat. During such movements of the valve away from and toward its seat, the pin 12 is pressed at its two opposite sides firmly against the parts 2ᵇ and 2ᶜ of the valve seat member, the forces applied to the two ends of pin 12 having substantial lateral resultant forces because of the cocked or angular position of the pin. The result of this is that the pin 12 is very accurately guided in a predetermined path and, inasmuch as the pin has a strong frictional engagement with the end of the valve 7, said end of the valve is likewise accurately guided in a similar path. Consequently when the valve returns to its seat it necessarily returns in the same position which it previously occupied on the seat. Furthermore, the pin 12, by holding the valve 7 to a predetermined path of movement, effectively prevents a lateral vibration of the valve while it is off its seat. Again, inasmuch as the valve is initially assembled with some endwise pressure on the thrust pin when the valve is seated, firm contact between the pin and the guide surfaces of the seat member and frictional engagement between the pin and the valve are maintained so as to oppose slight lateral movements of the valve structure which might result from jar or shock in the handling or transporting of the valve as well as avoiding shattering of the valve against the seat when the valve is open. In this connection it will be understood that the buffer vane 13, interposed between the diaphragm 5 and the adjacent end of the thrust pin, effectively prevents the transmission of any lateral movement of the diaphragm to the thrust pin, such lateral movement of the diaphragm being especially apt to occur during adjustment of spring 14. While the vane 13 flexes during endwise movement of the valve, the latter movement is so slight that there is no appreciable movement of the vane 13, where it engages the end of the pin 12, in a direction transverse to the axis of the pin.

As has been stated, the thrust pin 12 is caused to assume an inclined position in the bore of the seat member 2 when pressure is applied to the two ends of the pin by valve 7 and the vane 13. This action is due to the fact that the vane 13, before pressure is applied to it by the spring 14 and the bellows disc 5ᵇ, is disposed at an inclination to the axis of the valve so that when pressure is applied to the free end of the vane the force transmitted from it to the pin 12 has a lateral component that causes the pin to take the inclined position referred to. This action occurs in the initial assembly of the valve and also in the subsequent operation of the valve in the event the pressure on the outlet side of the valve compresses the spring 14 sufficiently to release the pin 12. When this occurs, if the valve is mounted with its axis horizontal, as in Fig. 1, the thrust pin 12 is permitted to fall or settle to the position shown in Fig. 6 where it no longer makes contact with the shoulder 2ᵇ of the seat member. During any such action in the operation of the valve, the valve 7 is of course seated and, when the pressure on the outlet side of the valve again falls, the renewed application of pressure to the ends of pin 12 causes it to assume the fully inclined position shown in Figs. 1 and 5. This action occurs regardless of the disposition of the valve axis, though naturally the pin 12 is moved to the inclined position with less effort when the axis of the valve is vertical than when it is horizontal. Furthermore, when the axis of the valve is horizontal as shown in the drawings the stepped form of the valve seat bore insures that the pin shall always be in at least a partially inclined or cocked position and thus reduces the effort necessary to restore the pin to the fully cocked position. It is noted further in this connection that if the vane 13 is mounted so that its own elasticity causes it to press resiliently against the adjacent end of the pin 12 as previously mentioned, such resilient pressure of the vane may be relied upon to hold the pin in its cocked position in the bore of the valve seat. As will be appreciated, only a light pressure is required for this purpose as the pin, in practice. is a relatively small and light member.

Naturally the engagement between the sides of the thrust pin 12 and the seat member affords a frictional resistance to the endwise movement of the thrust pin and this is advantageous as it serves to damp objectionable axial vibration of the valve in relation to its seat. A tendency to such vibration arises, for example, where the valve is used in a refrigeration system in which the compressor is driven at sufficiently high speed so that the suction pulsations are transmitted through the system to the diaphragm of the valve causing the latter to be opened and closed with each revolution of the compressor. With valves as heretofore constructed such an action not only sets up an objectionable noise due to the rapid seating and unseating of the valve but also results in an objectionable pounding of the valve on its seat which, in the absence of an effective guiding of the valve, rapidly deforms the valve seat with resultant leakage. With my improved construction the valve is so effectively guided that, even if it were permitted rapidly to open and close in the manner stated, it would not result in developing leakage of the valve, although the noise and the general deterioration due to the vibration would be objectionable. By using a valve spring 10 of suitable strength, properly adjusting the tension of the spring 14 and so designing the valve seat member 2 and the thrust pin 12 that the latter is inclined sufficiently in its guiding passage, the forces applied to the ends of the thrust pin will have sufficiently large lateral resultant pressures to insure sufficient frictional resistance to the endwise movement of the thrust pin to effectively damp and completely prevent endwise vibration of the valve 7 such as has been described. A specific example may be given as a guide to the reader in this connection. One of my expansion valves, such as has been described, was connected into a refrigeration system comprising a compressor running at 1800 R. P. M. With a valve spring (10) giving a pressure of 9 lbs. and with a thrust pin (12) of such diameter in relation to the diameter of the smaller bore of the valve seat as to give the axis of the thrust pin an angle of 2½° to the axis of the passage, the pulsations of the compressor acted in the manner above described to open and close the valve with each revolution of the compressor. This caused a very objectionable noise though it did not cause the valve to leak, because of the highly effective guiding of the valve to and from its seat—a striking example of the efficiency of the guiding action. By increasing the pressure of the valve spring from 9 to 16 lbs. and by increasing the angle of the thrust pin from 2½° to 5° the longitudinal vibration of the valve was completely stopped by reason of the greater damping action of the increased frictional resistance to the endwise movement of the thrust pin.

From my experience I believe that where a construction such as is shown in Figs. 1 and 6 is employed, a thrust pin angle of 5° is sufficiently great for all operating conditions which are likely to be met. However, it is obvious that the angle of the thrust pin can be varied over a considerable range. In some instances an angle as small as 1½° may be sufficiently great, while in other cases, particularly where it is desired to secure effective frictional damping of very strong suction pulsations, it may be desirable to make the angle larger than 5°.

In assembling the parts of the valve which has been described special care should be taken in the initial seating of valve 7. To this end, when the valve 7 carrying sleeve 8 and with the associated guide 9 and spring 10 are inserted into the bore of the casing member 1, care is taken that the conical end of the valve 7 is moved gently into centered contact with its seat. Then, screen 11 having been inserted and the connection 3 having been screwed home, a suitable tool is inserted through the bore of connection 3 to apply a strong pressure against boss 9b of guide 9. This forces the bottom of the socket of guide 9 against the conical end 7a of valve 7 and applies a corresponding pressure to the valve to force it firmly into the seat in its correct seating position. Not until this has been done should endwise pressure be applied to the thrust pin 12 by the spring 14. By following this procedure, when the normal working pressure of spring 14 is applied to the thrust pin 12, it is insured that the valve 7 is accurately and properly positioned on its seat when the strong frictional engagement between the valve and the pin 12 is established. The conical form 7a of the valve 7 insures that the pressure exerted against the valve in effecting its initial seating is applied axially and this further helps to insure a true initial seating of the valve. It will be understood that the function of the boss 9b of the guide 9 is simply to prevent the crushing in of the screen 11 when pressure is applied to the valve 7 to effect its initial seating.

While my invention, in its broader aspects, is not limited to the use of a single guide member to frictionally engage the valve structure, it is to be noted that the use of but one such member, in addition to obvious simplicity, has a functional advantage of substantial importance, namely, that if the point of frictional engagement between the thrust pin and the vane should be moved in any way a readjustment of the engagement is effected automatically. That is to say, if the said point of frictional engagement is displaced the valve will not seat properly until the gas pressure on the diaphragm is abnormally high. This lowers the pressure on the thrust pin and weakens the frictional engagement of the pin with the valve and vane. Then, when the gas pressure is again lowered the thrust pin is restored to its proper contact with the bore of the seat and resumes its normal guiding action on the valve. Thus, the device is self adjusting. It may be observed that this self adjusting action is more effective when the vane 13 is not designed, in the manner above explained, so that its own resilient pressure is adapted to hold the pin 12 in its fully cocked or angled position.

The inlet chamber unit of the casing comprising parts 1, 2 and 3 together with the parts therein assembled, constitutes a unitary assembly which has distinct advantages from the standpoint of manufacture. Such unitary assembly brings together in the one compact unit those parts of the expansion valve which call for the greater nicety and accuracy of construction. Consequently such assembly can conveniently be made a special subject of manufacture and distributed to other manufacturers to be combined with the other less accurate parts of expansion valves which may, as to such other parts, differ widely in design and construction. Furthermore, even when all parts of the complete valve mechanism are made in one plant, it is advantageous to bring together in the one sub-assembly those parts calling for the higher degree of accuracy and care so that the work of manufacture and assembly of such parts may be concentrated in the hands of workmen of the requisite skill while the work upon other parts of the apparatus may be handled by less skilled workers. This desirable result is secured without multiplying parts since the main sub-assembly part serves as an essential part of the outer main casing structure.

All parts of the inlet chamber assembly are simple, rugged and susceptible of being produced at extremely low cost. As has been noted, the part 1 can be formed from hexagonal bar stock and the same is true of the valve seat member 2, the connection 3 and the guide 9. The machining of all of these parts is obviously such as can be done at minimum cost. The screen member 11 is exceedingly simple and is effectively clamped in working position when the parts are assembled.

The construction of the outlet chamber unit of the casing structure of the expansion valve has marked advantages. Such advantages are due in large part to the form of the casing member 4. In apparatus of this character the parts subject to gas pressure should be formed of dense metal. In other words, such parts should properly be made of some form of wrought metal. Accordingly the main body part of expansion valves is commonly in the form of a forging. By giving the main part 4 of my improved valve casing a circular disc-like form I am enabled to forge the part at extremely low cost, as will be appreciated by those skilled in such matters.

The cupped casing part 6 is readily produced from sheet metal and applied to the part 4 by spinning. This further contributes to low production cost of the valve.

Other features of the construction might be pointed out as contributing to the simplicity and low production cost of the valve but a mere inspection of the drawings, particularly Fig. 1, discloses at once to those skilled in the art the simplicity of the construction, the ease with which the parts can be constructed and assembled at low cost and the absence of excess material in the structure, which further contributes to the low cost of production. However, it should be pointed out that the marked simplicity of the construction and the absence of excess material are in a considerable measure made possible by the fact that the valve is arranged to open against the flow of the fluid. This arrangement of the valve makes easier the attainment of simplicity and compactness of construction with absence of excess material, but the successful use of such a valve arrangement has not heretofore been possible because when the valve is arranged to open against the flow the valve has a distinctly greater tendency to vibrate laterally and pound upon the seat with resultant noise and distortion of the seat, as previously described, whereas, if the valve is arranged to open with the flow, the stream of liquid spreading around the point of the valve seems to damp and minimize such vibratory movement. By virtue of the effective guidance of the valve which my improved construction provides the lateral valve vibration is completely obviated and the markedly simple and advantageous construction illustrated is facilitated.

In Fig. 7 I have illustrated a modified construction of some of the parts of the valve above described. In this modified construction the casing part 1', the valve seat member 2', the valve 7', its sleeve 8', the spring 10', the diaphragm member 5' and the diaphragm spring 14' are either like or similar to the construction of the corresponding parts of the valve shown in Fig. 1. The differences between the two forms of construction are limited to the casing parts 1', 2' and 4' and the buffer vane 13', the casing part 1' instead of the part 4' being slotted to secure and carry the shorter buffer vane 13'. With the buffer vane attached to the casing part 1' said vane serves to hold the thrust pin 12' in the passage of the valve seat member 2' in the handling and assembling of the parts associated with said casing part 1'.

The operation of the construction embodying the modification shown in Fig. 7 is substantially the same as the operation of the first described valve.

In the second modified form of construction shown in Fig. 8 the casing parts 1" and 4", the valve seat member 2", the valve 7", its sleeve 8", the spring 10", the diaphragm member 5", the diaphragm spring 14", the thrust pin 12" and the buffer 13" are either like or similar to the construction of the corresponding parts of the valve shown in Fig. 1, the differences between the two forms of construction being limited to the valve seat member and the thrust pin. The bore of the seat member 2" is formed with two sections of different diameter and the pin 12" extends through the bore section of smaller diameter. Also the thrust pin is formed at its valve-engaging end with a head which is larger in diameter than the smaller section of the bore of member 2" so that when the pin has been inserted through the larger end of the bore in the assembly of the parts it cannot drop out of the valve seat member. As will be seen, such a construction of the pin 12" effects the result secured in Fig. 7 by attaching the vane 13' to the casing part 1'.

The operation of the valve last described is the same as that of the valve first described.

In Fig. 9 I have shown my improved valve guiding and actuating means embodied in a low side float valve of a refrigerant evaporator of the type commonly and extensively employed in so-called flooded systems. In this construction 20 is a header carrying a series of circulating tubes partially shown at 21. The header is provided at one end with a permanent closure 22 which carries an inlet chamber casing structure 23. In the construction shown the casing 23 is formed integral with the closure 22. 24 is a connection secured by one or more machine screws 25 to the closure 22, the connection 24 having its inlet passage 24$^a$ for liquid refrigerant in register with the inlet chamber 23$^a$ of casing part 23, and its outlet passage 24$^b$ for vaporized refrigerant in register with the outlet passage 22$^a$ of closure 22. Said closure carries an upwardly extended suction pipe 26 designed to conduct the evaporated refrigerant from the upper part of the header into the suction passages 22$^a$ and 24$^b$. The casing 23 is fitted with a valve seat member 27 having a seat proper 27$^a$ which is engaged by the conical surface of the needle valve 28.

Said valve has fast thereon a sleeve or collar 29 which is engaged by one end of the coiled spring 30 which has the adjustable threaded sleeve 31 as an abutment for its other end. An inlet screen 32 is clamped between the closure 22 and the fitting 24.

In the passage of the valve seat member 27 is arranged a thrust pin 33 of the same character as that shown in Figs. 1 and 7, one end of the pin engaging the flat truncated end of the valve 28 while its other end engages a flexible buffer vane 34 secured to the end of the casing 23.

35 is a float pivoted on a pin 36 carried by the casing 23 and provided with a plate-like finger 35$^a$ adapted to engage the buffer vane 34 and press it against the thrust pin 33, when the float is lowered.

In the operation of the evaporator the movement of the float acts in the well known manner to open and close the inlet valve 28 to admit and maintain a substantially fixed amount of liquid refrigerant in the evaporator. As the liquid refrigerant is evaporated and withdrawn from the evaporator the level of the liquid in the header tends to fall correspondingly with resultant lowering of the float 35 so that it presses against the thrust pin 33, which in turn is moved endwise to open valve 28 and admit more liquid refrigerant, the weight of the float being sufficient to overbalance the force of spring 30. The added refrigerant restores the liquid level in the header with resultant rise of the float 35, permitting the spring 30 to return the valve 28 to its seat. During this operation of the valve the thrust pin 33 functions both to actuate the valve and to guide it in its movements in the manner described in connection with the expansion valve shown in Figs. 1–6. The advantages of the effective guiding of the valve 28 are similar to the advantages cited in connection with the expansion valve and need not be repeated. However, it should be noted that my improved guiding means has certain advantages peculiar to the use with a flooded evaporator, namely, (1) that, since the effective guiding action permits arrangement of the valve on the inlet side of the seat, said valve can readily be removed from the outside of the evaporator by simply detaching connection 24 and this permits the use of a one-piece closure 22 permanently secured in the header, and (2) that the float can be made relatively heavy because of the counterbalancing effect of the valve spring.

Figure 10:
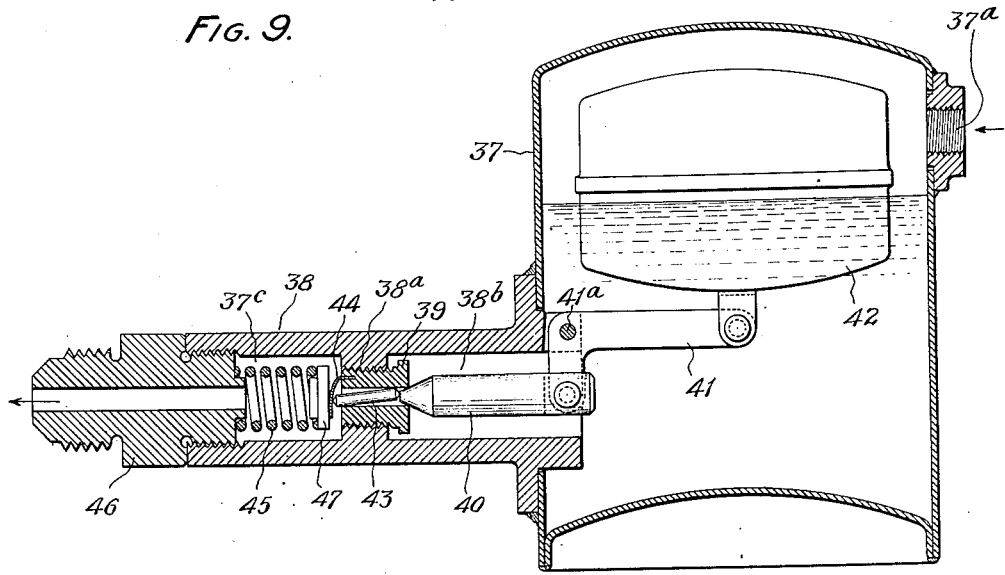
Fig. 10 is a vertical sectional view of a refrigerant float valve in which the float is on the high pressure side of the valve.

In Fig. 10 I have shown my improved method of actuating and guiding a valve embodied in a "high side" float valve for use in connection with refrigerating systems. In this apparatus 37 is a float chamber provided with an inlet 37$^a$ for liquid refrigerant and fitted with a float valve body or casing 38. The valve body 38 is formed with a partition 38$^a$ which forms in the casing an inlet chamber 38$^b$ in communication with the tank 37 and an outlet chamber 38$^c$. A valve seat member 39 is mounted in the partition 38$^a$. In the chamber 38$^b$ is arranged a needle type valve 40 to cooperate with the seat 39, one end of the valve being pivotally connected to a bell crank lever 41 pivoted on a pin 41$^a$ carried by the valve body 38. The other end of the lever 41 is pivotally connected to a float 42. When this float rises the valve 40 is drawn away from its seat and when the float falls the valve is forced against its seat.

The conical end of the valve 40 is guided by a thrust pin 43 having a loose fit in the bore of the valve seat member 39. As in the prior constructions, this pin has conical ends, one of which engages the flat end of the valve 40 while the other engages a buffer vane 44 carried by the valve seat 39. Suitable endwise pressure is applied to the guide pin 43 by a spring 45 which abuts at one end against a connection 46 threaded into the end of the valve body 38, and at its other end against a disc 47 which in turn bears against the buffer vane 44. The tension of spring 45 is such as to be overcome by the weight of the float when the liquid level in tank 37 falls.

In the typical use of apparatus of this character the liquid refrigerant inlet 37$^a$ of the tank is connected to a refrigerant condenser which in turn is connected to a compressor, and the connection 46 is connected with an evaporator of some sort which in turn is connected with the suction side of the compressor. As the liquid refrigerant is delivered into the tank 37 the float rises to open the valve 40 and permit escape of the liquid refrigerant past the valve under the pressure of the high side of the system. Meanwhile the spring 45 exerts a suitable thrust pressure upon the pin 43 which is guided in the manner previously described to accurately follow a predetermined path and, by its frictional engagement with the valve 40, the pin similarly guides the conical end of said valve. As the liquid level in the tank 37 falls the float falls with it and by its weight closes the valve, the weight of the float overcoming the resistance of spring 45. During the closing movement of the valve it is accurately guided by thrust pin 43 to retrace its path and return with precision and without lateral vibration to its proper position on its seat.

Figure 11:
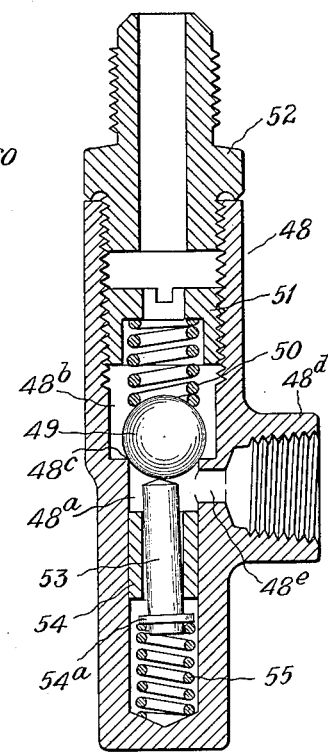
Fig. 11 is a central longitudinal sectional view of a check valve embodying certain features of my invention.

Fig. 11 illustrates a check valve embodying my improved method of guiding the valve and overcoming vibration and chatter. In this construction the valve body 48 is formed with an inlet chamber 48$^a$ and an outlet chamber 48$^b$, the latter being of larger bore than the former and the edge 48$^c$ of the shoulder between the two bores serving as a seat for the ball valve 49. The ball is yieldingly pressed against its seat by a coiled spring 50 which is provided with a threaded abutment 51 adjustably mounted in the outlet chamber 48$^b$. The valve body is provided with an inlet boss 48$^d$ which communicates through passage 48$^e$ with the inlet chamber 48$^a$. The discharge end of the valve body is fitted with a threaded connection 52.

The inlet chamber 48$^a$ of the valve body is extended in length to accommodate a guide pin 53 which has a loose fit in the bore of a sleeve 54 which is rigidly secured by a forced fit in the chamber 48$^a$. One end of the pin 53 has a conical form to engage the valve 49 and at its other end the pin is formed with a collar or flange 54$^a$ which forms an abutment for one end of the coiled spring 55 interposed between the pin and the end of the chamber 48$^a$.

In the operation of the valve, the pressure of the spring 50 being greater than that of the spring 55, the valve normally rests upon its seat in closed position. When the pressure of the fluid entering the inlet chamber 48$^a$ is great enough, in conjunction with the spring 55, to overcome the pressure of spring 50, the valve is lifted from its seat, meanwhile being guided by the pin 53 in a manner previously described in connection with the expansion valve. And when the fluid pressure against the valve on its inlet side is again lowered the valve is returned to its seat, meanwhile being guided and returned accurately to its proper seating position without lateral vibration or chattering.

I have not commented at length upon the advantages incident to the constructions shown in Figs. 9, 10 and 11, but it will be apparent without comment that these several devices have the advantages incident to the accurate and effective guiding of the valve which were more fully pointed out in connection with the expansion valve first described.

In the several forms of construction above described the valve-guiding devices are of the same type of construction. I now desire to point out that the valve-guiding means may take a variety of forms. Thus thrust pins differing both in form and arrangement from those above described may be employed and the main guide member or members may not be in the form of a thrust pin or pins at all but may take distinctly different forms. In Figs. 12 to 16, inclusive, I have shown several modified forms of the valve-guiding devices by way of illustration, only the parts constituting or immediately cooperating with the valve-guiding devices being illustrated.

Figure 12:
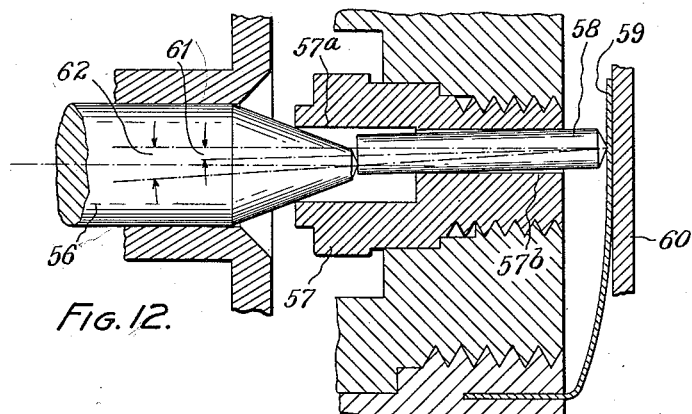
Figs. 12, 13 and 14 are fragmentary sectional views showing modified forms of my improved valve guide means, the views being on enlarged scales for the sake of clearness.

In Fig. 12, 56 is a portion of a valve of the needle type arranged to cooperate with a valve seat 57 and to be pressed against that seat by a spring (not shown). The valve seat member 57 is formed with a large bore 57$^a$ at one end and with a much smaller bore 57$^b$ communicating with the larger bore and arranged eccentrically in relation thereto. In the bore 57$^b$ is arranged a thrust pin 58, the pin having a rather loose fit in the bore, but not as loose as the fits of the thrust pins in the previously described constructions. The pin 58 has one flat end arranged to engage the point of the conical end of valve 56, while the other end of the pin has a cone shape and has a point contacting with a buffer vane 59 which is pressed against the pin by a diaphragm plate 60.

In this construction, while the axis of the pin 58, when the latter is canted in the passage 57$^b$, to the axis of said passage, is relatively small, as shown at 61, yet because of the eccentric arrangement of the passage 57$^b$ and pin 58 relative to the valve 56, the angle which measures the effective lateral resultant forces applied to the ends of the thrust pin 58 is much larger, as indicated at 62. In a word, the construction shown in Fig. 12 indicates that the desired lateral pressure of the thrust pin against its guide surfaces can be secured otherwise than by disposing the thrust pin at a large angle to the axis of the valve.

Figure 13:
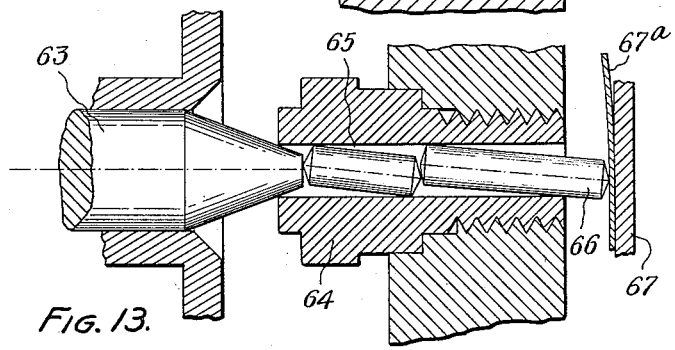

In Fig. 13 still another way of securing an amply large lateral pressure upon the guide pin is shown. Here a needle valve 63 cooperates with a valve seat member 64 which is formed with a straight bore or passage and a plurality of thrust pins, 65, 66 are provided, these pins being considerably smaller in diameter than the bore of the valve seat. The pin 65 is arranged to engage the valve 63 while the pin 66 engages the pressure diaphragm parts 67, 67a. With this construction, when the pins 65 and 66 are subjected to endwise pressure they take canted positions in the bore of the valve seat member, as indicated, and, because of their relatively short length, the lateral resultant forces applied to the pins are relatively large and the frictional resistance to the endwise movement of the guide pins is correspondingly great.

Figure 14:
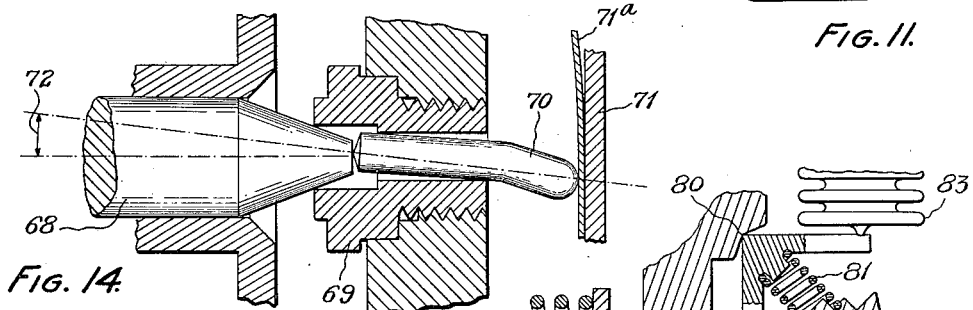

Still another method of securing adequately large lateral pressure of the thrust guide member against its guide surfaces is shown in Fig. 14. Here a needle valve 68 cooperates with a valve seat 69 which is provided with a large bore at its valve end and a smaller bore communicating therewith. In the smaller bore is arranged a thrust pin 70 which is bent as shown and formed with a conical end to engage the valve 68 and a rounded end to cooperate with the diaphragm members 71, 71a. Here the angle indicated at 72 is the measure of the lateral resultant forces applied to the guide pin 70 and, notwithstanding the fact that the pin 70 is not much smaller than the bore in which it fits, the angle 72 is relatively large, because of the bent form of the pin.

Figure 15:
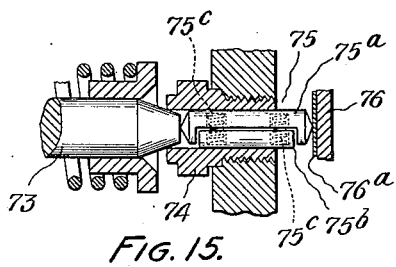
Fig. 15 is a fragmentary sectional view showing another modified form of valve guide device.

In Fig. 15 I have shown a valve lifting and guiding member of the thrust type but differing in operation somewhat from those previously described. Here a needle valve 73 cooperates with a valve seat member 74 which is provided with a straight uniform bore in which is arranged a guide device designated as an entirety by 75 and comprising an elongated main thrust member 75a formed with conical ends, a cooperating elongated member 75b and coiled springs having their ends engaging sockets formed in the adjacent face of the members 75a and 75b and serving to press the members 75a and 75b firmly against the opposite sides of the bore of the valve seat member 74. One end of the thrust member 75a engages the valve 73 while its other end engages the diaphragm parts 76, 76a.

With this latter type of construction, just as in those formerly described, the main guide member (75a) is pressed firmly against and maintained in contact with the stationary surface of the seat member 74 so that endwise movement of the member 75 is effectively and accurately guided and it in turn effectively and accurately guides the movement of the valve 73 while off its seat and also restrains it from lateral movement while on its seat. In this construction the lateral force serving to maintain the main guide member in firm contact with its guiding surfaces is supplied by the springs 75c.

Figure 16:
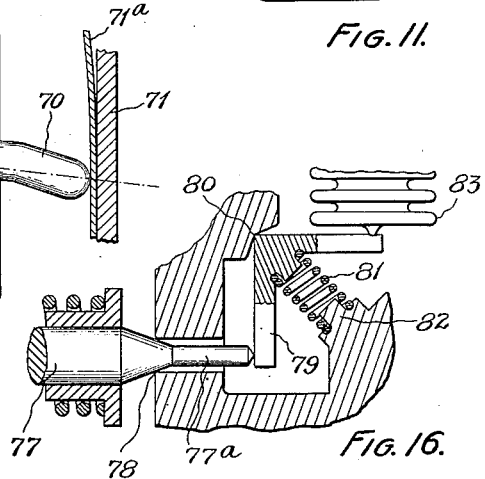
Fig. 16 is a similar fragmentary sectional view showing still another form of the valve guide device.

In Fig. 16 still another method of securing the desired guiding action is shown. In this case needle valve 77 cooperates with seat 78 and is provided with an extension 77a extending through the passage controlled by the valve. 79 is a bell crank formed with a knife edge seated at 80 on the valve body or casing structure and yieldingly held in operative contact with said structure by a spring 81 having a suitable abutment at 82. One arm of the bell crank 79 engages the conical end of the valve extension 77a while the other arm of the bell crank engages a diaphragm device 83.

In this construction a relatively small rocking movement of the bell crank 79 causes the unseating and seating of valve 77. Such movement of the bell crank follows accurately a predetermined path because the knife edge of the bell crank is maintained by the spring 81 firmly pressed against its seat and the frictional engagement between the bell crank 79 and the valve extension 79a insures the corresponding guidance and control of the valve 77. This last construction, however, obviously offers but a small amount of frictional resistance to the endwise movement of the valve.

It will now be apparent that all of the various forms of valve-guiding devices which have been described are characterized by the fact that the moving guide device is caused to accurately follow a predetermined path by being pressed into firm contact with the relatively fixed guiding surface so that there is no dependence upon nicety of fit between the moving and fixed guide members. It is also characteristic of the device described that the moving member which guides the valve does so by frictional engagement therewith.

By reason of the frictional engagement last referred to and of the fact that a single guide device so frictionally engages the valve or valve structure, my improved method of guiding the valve is characterized by the self-adjusting feature previously mentioned in connection with the expansion valve. That is, with any one of the constructions that have been described if the point of engagement between the guide member and the valve or valve structure should change so that the valve would be inaccurately lowered to its seat the pressure forcing the tapered valve toward its seat will soon center it in relation to the seat by overcoming the frictional resistance afforded by the guide member, whereupon the guide devices will again act to accurately guide the valve to its true seating position.

The present application constitutes a continuation in part of my application Serial No. 672,547, filed May 24, 1933.

As is indicated by the variety of the forms of construction illustrated and described, my improvements are not dependent upon any particular form of construction. On the contrary, the invention can be practiced by the use of many different specific forms of construction within the scope of the appended claims.

What I claim is:

1. In a valve device, the combination of a casing structure having a port and a valve seat associated with said port; a reciprocatory valve arranged to engage the valve seat and control flow through the port; and means for guiding the valve in its opening and closing movements comprising a member frictionally engaging the valve and movable therewith, a part of the casing structure movably engaged by said member, and means for pressing said member into firm engagement with said part of the casing structure during movement of the member, whereby the movement of the member is effectively guided in a predetermined path relative to the valve seat.

2. In a valve device, the combination of a casing structure having a port and a valve seat associated therewith; a reciprocatory valve arranged to engage the valve seat and control flow through the port; and means for guiding the valve in its opening and closing movements comprising a member frictionally engaging the valve and movable therewith, a part of the casing structure movably engaged by said member, and means for keeping the said member pressed into firm engagement with the said part of the casing structure.

3. In a valve device, the combination of a casing structure having a port and a valve seat associated therewith; a valve structure having a reciprocatory valve part arranged to engage the valve seat and control flow through the port; means for pressing the valve part against the seat; and means for guiding the movement of the valve part while off the seat comprising a thrust member frictionally engaging the valve structure and movable therewith, a part of the casing structure having zones spaced apart lengthwise of the thrust member and slidably engaging opposite sides of said member, and means for pressing the thrust member against the valve structure, the parts of the device being so formed and arranged that the thrust member is firmly pressed laterally against the slidably engaging zones of the casing structure during movement of the valve to and from its seat.

4. In a valve device, the combination of a casing structure having a port and a valve seat associated therewith; a valve structure having a reciprocatory valve part arranged to engage the valve seat and control flow through the port; means for yieldingly pressing the valve structure toward the seat; and means for unseating the valve and guiding it in its movement while off its seat comprising pressure means adapted to exert pressure in a direction to unseat the valve, a movable thrust member for transmitting the force of said pressure means to the valve structure and having frictional engagement with the latter, and a part of the casing structure having zones spaced apart lengthwise of the thrust member and slidably engaging opposite sides of said member, the slidably-engaging zones being so arranged in relation to the forces applied to the thrust member that said member is firmly pressed against the said zones and guided in a predetermined path relative to the valve seat during movement of the valve while off its seat.

5. In a valve device, the combination of a casing structure having a port and a valve seat associated therewith; a valve structure having a reciprocatory valve part arranged to engage the valve seat and control flow through the port; means for yieldingly pressing the valve structure toward the seat; and means for unseating the valve and guiding it in its movement while off its seat comprising pressure means adapted to exert pressure in a direction to unseat the valve, a movable thrust member for transmitting the force of said pressure means to the valve structure and having frictional engagement with the latter, means interposed between the thrust member and said pressure means to prevent transmission of lateral movement of the pressure means to the thrust member, and a part of the body structure having zones spaced apart lengthwise of the thrust member and slidably engaging opposite sides of said member, the slidably-engaging zones being so arranged in relation to the forces applied to the thrust member that said member is firmly pressed against the said zones and guided in a predetermined path relative to the valve seat during movement of the valve to and from its seat.

6. In a valve device, the combination of a casing structure having an elongated port with a valve seat in one end thereof; a valve structure having a reciprocatory valve part arranged to engage the valve seat and control flow through the port; means for pressing the valve part against the seat; and means for guiding the movement of the valve part while off the seat comprising an elongated movable thrust member disposed in the port with one of its ends frictionally engaging the said valve part, and means engaging the other end of the thrust member for pressing it against the valve part, the diameter of the thrust member being so much smaller than the diameter of the port that the force applied to the thrust member presses it firmly against the sides of the port at points on opposite sides of the thrust member and spaced apart longitudinally thereof, whereby the thrust member is guided in a predetermined path relative to the valve seat during its endwise movement.

7. In a valve device, the combination of a casing structure having inlet and outlet chambers with a passage joining the two chambers and a valve seat associated with said passage, the casing structure having a diaphragm constituting a part of the wall of the outlet chamber and movable toward and from the valve seat; a valve structure in one of the chambers having a reciprocatory valve part to cooperate with the said seat; means for pressing the valve toward the seat; means for applying pressure to the diaphragm to move it in the valve-opening direction; means comprising a thrust pin for transmitting the said movement of the diaphragm to the valve structure to unseat the valve, said thrust pin having a frictional engagement with the valve structure; and guide means carried by the casing structure and having zones spaced apart lengthwise of the thrust pin and slidably engaging opposite sides of said pin, the slidably-engaging zones being so arranged in relation to the forces applied to the thrust pin that the latter is firmly pressed laterally against the said zones and guided in a predetermined path relative to the valve seat during movement of the valve while off its seat.

8. In a valve device, the combination of a casing structure having inlet and outlet chambers with a passage joining the two chambers and a valve seat associated with said passage, the casing structure having a diaphragm constituting a part of the wall of the outlet chamber and movable toward and from the valve seat; a valve structure in one of the chambers having a reciprocatory valve part to cooperate with the said seat; means for pressing the valve toward the seat; means for applying pressure to the diaphragm to move it in the valve-opening direction; means comprising a thrust pin for transmitting the said movement of the diaphragm to the valve structure to unseat the valve, said thrust pin having a frictional engagement with the valve structure; means interposed between the diaphragm and the thrust pin to prevent transmission to the pin of movement of the diaphragm transverse to the pin; and guide means carried by the casing structure and having zones spaced apart lengthwise of the thrust pin and slidably engaging opposite sides of said pin, the slidably-engaging zones being so arranged in relation to the forces applied to the thrust pin that the latter is firmly pressed laterally against the said zones and guided in a predetermined path relative to the valve seat during movement of the valve while off its seat.

9. In a valve device, the combination of a casing structure having inlet and outlet chambers with a passage joining the two chambers and having a valve seat associated with said passage, the casing structure having a diaphragm constituting a part of the wall of the outlet chamber and movable toward and from the valve seat; a valve structure disposed in the inlet chamber of the casing and having a reciprocatory valve part to cooperate with the said seat; means for pressing the valve toward the seat; means for applying pressure to the diaphragm to move it in the valve-opening direction; and means comprising a thrust pin disposed in the passage between the inlet and outlet chambers for transmitting the said movement of the diaphragm to the valve structure to unseat the valve, said thrust pin having a frictional engagement with the valve structure and a sliding engagement with opposite sides of the passage wall at points spaced apart lengthwise of the pin and the pin being disposed at substantial angles to the lines of the forces applied to its ends, whereby the pin is firmly pressed against the opposite walls of the passage and guided in a predetermined path relative to the valve seat during movement of the valve while off its seat.

10. In a valve device, a casing structure comprising an inlet chamber unit and an outlet chamber unit detachably secured together, the inlet chamber unit having an inlet passage and an outlet passage surrounded by a valve seat; a reciprocatory valve in the inlet chamber unit; means for pressing the valve toward the said seat; a thrust pin disposed in the said outlet passage with one end arranged to frictionally engage the valve; and means associated with the outlet chamber unit for applying a force to the other end of the thrust pin, the said means, the thrust pin, the walls of the passage surrounding it and the valve being so constructed and arranged that the forces applied by said means and by the valve to the ends of the pin cause sufficiently large lateral resultant forces to press the pin into firm contact with the walls of the passage in zones on opposite sides of the passage and spaced apart lengthwise of the pin.

11. In a valve device, a unitary casing structure having an inlet passage and an outlet passage surrounded by a valve seat; a reciprocatory valve in the casing; means for pressing the valve toward the seat; and a thrust pin disposed in the said outlet passage with one end arranged to frictionally engage the valve and its other end arranged to sustain an actuating force adapted to move the pin endwise and unseat the valve, the thrust pin, the walls of the passage surrounding it and the valve being so constructed and arranged that the forces applied to the ends of the pin cause sufficiently large lateral resultant forces to press the pin into firm contact with the walls of the passage in zones on opposite sides of the passage and spaced apart lengthwise of the pin.

12. In a check valve, the combination of a casing having a valve seat therein; a reciprocatory valve cooperating with the seat; a spring pressing the valve against the seat; and means for guiding the valve in its opening and closing movements comprising a thrust pin having engagement with the casing structure in zones on opposite sides of the pin and spaced apart lengthwise thereof, and a spring exerting a lengthwise pressure on the thrust pin to force it into frictional engagement with the valve, the construction and arrangement of the parts being such that the forces applied to the thrust pin cause lateral resultant forces that press the pin into firm engagement with the casing in the said zones, whereby the pin moves in a predetermined path relative to the valve seat when the valve moves and guides the valve by its frictional engagement therewith.

13. In a valve device, the combination of a casing structure having an elongated passage with a valve seat in one end thereof, the said passage having a plurality of different diameters; a reciprocatory valve arranged to engage the valve seat and control flow through the passage; means for pressing the valve against the seat; and means for guiding the movement of the valve while off the seat comprising an elongated thrust pin disposed in the passage with one of its ends frictionally engaging the said valve, and means engaging the other end of the thrust pin for pressing it against the valve, the sections of the passage bore of different diameters being so arranged in relation to each other that when the thrust pin engages one side of the bore at a plurality of points said pin is disposed at an angle to the axis of the passage and the diameter of the thrust pin being so much smaller than the passage that the force applied to the thrust pin presses it firmly against the sides of the passage at points on opposite sides of the pin and spaced apart longitudinally thereof, whereby the thrust pin is guided in a predetermined path relative to the valve seat during its endwise movement.

EDWARD M. MAY.